United States Patent [19]

Szamborski

[11] 3,950,828

[45] Apr. 20, 1976

[54] CHAIN CLASP

[75] Inventor: Edmund Szamborski, Scarsdale, N.Y.

[73] Assignee: American Gold Chain Company, Inc., Blauvelt, N.Y.

[22] Filed: Feb. 3, 1975

[21] Appl. No.: 546,827

[52] U.S. Cl. .................. 24/232 R; 24/241 CH; 24/241 S
[51] Int. Cl.² .......................................... A44B 13/00
[58] Field of Search........ 24/201 BN, 73 CE, 156 P, 24/157 P, 230.5 CR, 232, 241 CH, 241 S, 241 PL, 241 P, 241 SP, 248 F

[56] References Cited
UNITED STATES PATENTS

| 1,062,457 | 5/1913 | Hadley | 24/241 PL UX |
| 1,264,676 | 4/1918 | Morgan | 24/232 |
| 1,491,240 | 4/1924 | Johnston | 24/232 |
| 1,635,975 | 7/1927 | Nardin | 24/232 |
| 1,737,481 | 11/1929 | Rabb | 24/232 |

FOREIGN PATENTS OR APPLICATIONS

| 41,785 | 8/1925 | Norway | 24/232 |

*Primary Examiner*—Donald A. Griffin
*Attorney, Agent, or Firm*—Salter & Michaelson

[57] ABSTRACT

A chain clasp having a base member on which a lock member is pivotally mounted, an opening being formed in the base member with which a space communicates that provides exterior access to said opening and thereby provides for mounting of a free end of the chain on said base member, the lock member being pivotally movable relative to the base member into overlying relation therewith for sealing communication between the space and opening and thereby locking the free end of the chain on the base member.

10 Claims, 7 Drawing Figures

CHAIN CLASP

BACKGROUND OF THE INVENTION

The present invention relates to a clasp for ornamental chain that interconnects the ends of the ornamental chain when the chain is placed around the neck or wrist of a wearer.

Various kinds of clasps have been utilized heretofore for interconnecting the ends of ornamental chain, and the usual construction was the spring ring, which included a spring urged plunger that was moved to an open position for receiving a jump ring that was attached to the free end of the chain. Although this kind of clasp has been in use for many years, it is sometimes difficult to obtain because of material shortages, and furthermore has been objectionable in some respects because of the difficulty in manipulating the spring plunger when the clasp is opened. Further, the spring ring is not very ornamental in appearance and did not add anything of ornamental significance to the bracelet or chain with which it was used.

Various other kinds of clasps have been employed over a period of time with jewelry articles such as ornamental bracelets, chains and necklaces; but in most instances, these heretofore known clasps were complicated in structure, which necessarily increased the cost thereof, and oftentimes were somewhat awkward in use and therefore were not acceptable by the user.

SUMMARY OF THE INVENTION

The present invention relates to a unique clasp construction for an ornamental chain, wherein the clasp is permanently attached to one end of the chain, the free end of the chain being releasably attached to the clasp when the chain is placed around the neck or wrist of the wearer. The clasp as embodied in the subject invention includes a base member having a central portion in which an opening is formed. The fixed end of the chain is permanently connected to an end portion of the base member, and a section of the central portion is cut away at the periphery thereof to form an exposed hook or lug over which the free end of the chain is threaded for the attachment thereof to the base member. A lock member is pivotally mounted on the base member and is movable from an open position to a closed position, wherein the central opening in the base member and the cut-out section communicating therewith are sealed to lock the free end of the chain on the base member.

Accordingly, it is an object of the present invention to provide a clasp for an ornamental chain having a base member to which the free end of the chain is releasably attached, the clasp further including a lock member that is pivotally mounted on the base member and that is movable into overlying relation therewith to lock the free end of the chain on the base member.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
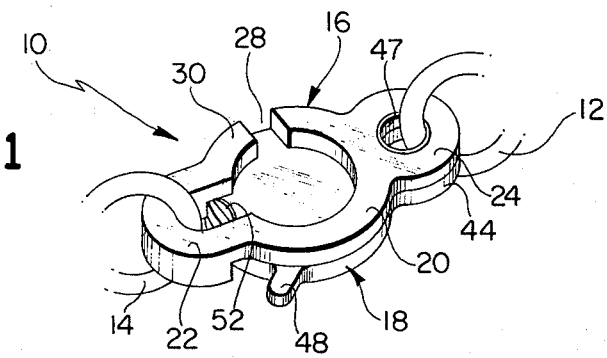
FIG. 1 is a perspective view of the clasp embodied in the present invention as shown in the closed position thereof.

Referring now to the drawing and particularly to FIG. 1, the clasp embodied in the present invention is illustrated and is generally indicated at 10. The clasp 10 is intended for attachment to the end of an ornamental chain, an end link 12 being illustrated as the end of the chain that is permanently attached to the clasp 10. An opposite end link 14 is attached to the free end of the chain and is intended to be releasably connected to the clasp 10 as will be described.

Figure 2:
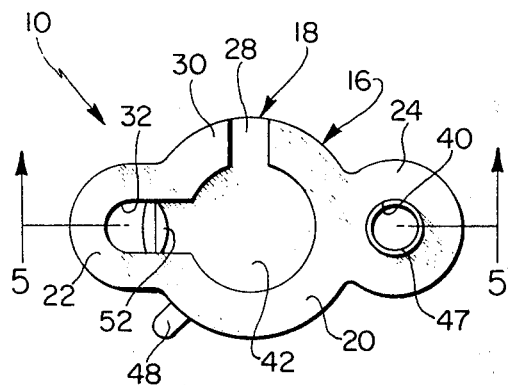
FIG. 2 is a bottom plan view thereof.
Figure 3:
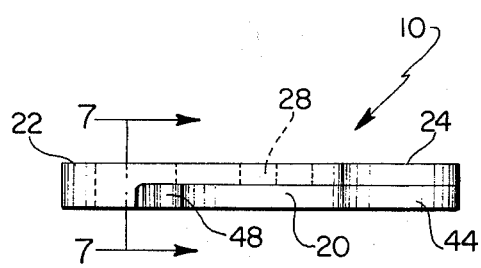
FIG. 3 is a side elevational view thereof.
Figure 5:
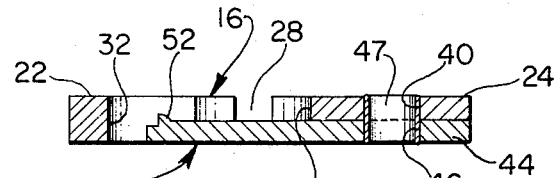
FIG. 5 is a sectional view taken along line 5—5 in FIG. 2.
Figure 6:
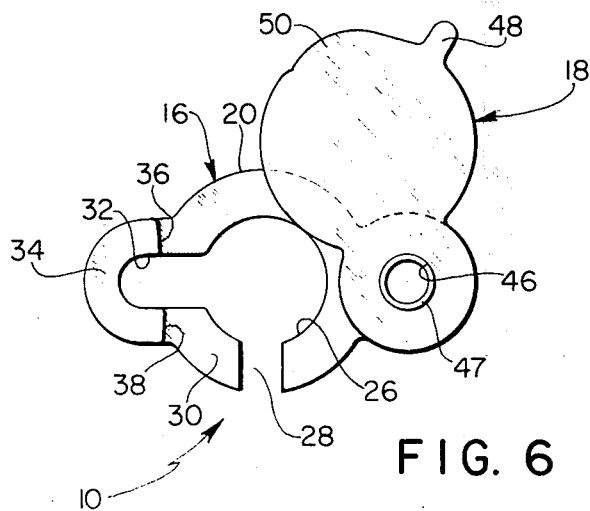
FIG. 6 is a view similar to FIG. 4, but showing the lock member in the open position thereof.
Figure 7:
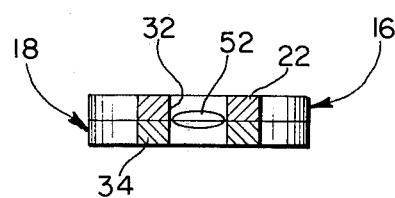
FIG. 7 is a sectional view taken along line 7—7 in FIG. 3.

As more clearly illustrated in FIGS. 2 and 6, the clasp 10 includes a base member generally indicated at 16 to which a lock member generally indicated at 18 is pivotally connected. As shown in FIG. 1, the end link 14 of the chain is releasably attached to the base member 16; and, as will be described, upon pivotal movement of the lock member 18 relative to the base member 16, the chain may be removed from the locked position on the base member by disengagement of the end link 14 therefrom. As illustrated in FIGS. 3 and 5, the base member 16 is preferably formed of flat stock and includes a main or central body portion 20 to which end portions 22 and 24 are integrally joined. The main or central portion 20 has a generally round configuration and is formed with central opening 26 therein that in effect forms the central portion in a curved marginal strip. A section is cut out from the marginal strip or central portion 20 to form a space 28 that communicates with the opening 26. As shown more clearly in FIG. 6, the space 28 defines an exposed lug or hook 30 over which the ring 14 is threaded in the mounting thereof on the base member 16.

Figure 4:
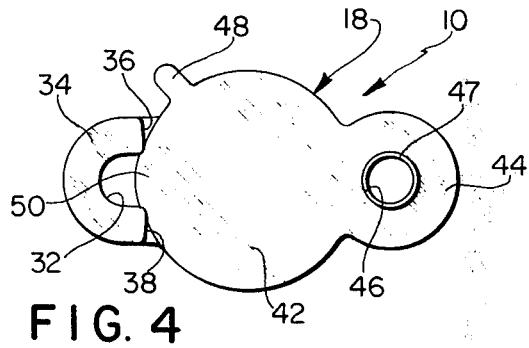
FIG. 4 is a top plan view thereof.

Formed in the end portion 22 is a slot 32 that communicates with the opening 26 and that is shaped to receive the link 14 when it is threaded over the hook 30 in the connection of the chain to the clasp 10. Joined to the end portion 22 and formed as a part thereof in overlying relation is a U-shaped element 34, the ends of which face inwardly and define shoulders 36 and 38 that provide for locating of the lock member 18 in the closed position thereof. As illustrated in FIGS. 4 and 6, the shoulder 38 extends inwardly more than the shoulder 36, the purpose of which will be described hereinafter. The other end portion 24 of the base member 16 has a generally circular configuration in which an opening 40 is formed centrally thereof.

The lock member 18 includes a main body 42 that is imperforate and that is preferably formed of a flat stock so as to be slidably movable into overlying relation with respect to the central portion 20 of the base member 16. Joined integrally to the body 42 of the lock member 18 is an extension 44 that also has a generally circular configuration that corresponds generally to that of the end portion 24 of the base member 16. An opening 46 is formed in the extension 44 and a suitable rivet 47 extends through the openings 40 and 46 of the base member 16 and lock member 18, respectively, to mount the lock member or pivotal movement with respect to the base member.

Integrally joined to the body 42 of the lock member 18 and extending outwardly therefrom is a tab 48 that defines a finger grip for pivotally moving the lock member 18 to and from the open and closed positions thereof. As more clearly illustrated in FIG. 6, a protuberance 50 is formed on the peripheral edge of the body 42 of the lock member 18 that is opposite to the extension 44 and defines a locking cam for locating the lock member in the closed position thereof. As further illustrated in FIGS. 2 and 5, a detent 52 is formed on the underside of the protuberance 50 and also acts to locate the lock member 18 in the proper oriented locking position relative to the base member 16 when the free end of the chain is attached to the clasp.

Prior to use of the clasp 10, the end ring 12 is joined thereto by location of the end ring 12 in the openings 40 and 46 as formed in the base member 16 and lock member 18, respectively. One end of the chain to which the ring 12 is attached is thereby permanently secured to the clasp 10. When it is desired to locate the chain around the neck or wrist of a wearer, the lock member 18 is moved to the open position thereof by pivotal movement thereof to that position illustrated in FIG. 6. This is accomplished by the user grasping or engaging the tab 48 with her finger and urging the lock member 18 outwardly in a pivotal movement until the body 42 of the lock member clears the space 28 as formed in the marginal strip of the central portion 20 of the base member 16 and also clears the slot 32. With the space 28 and slot 32 exposed, the jump ring 14 of the free end of the chain is threaded over the lug or hook 30 and is moved into the slot 32 as formed in the end portion 22 to attach the other end of the chain to the clasp. The ring 14 is locked in place in the slot 32 by returning the lock member 18 to the closed position thereof, wherein the space 28 and the opening 26 are concealed as illustrated in FIG. 4. As the lock member 18 moves to the closed position thereof, the detent 52 engages the outer edge of the central portion 20 approximately at the junction thereof with the end portion 22, and is formed thereover to place the lock member under tension as it moves to the closed position. As the detent 52 clears the central portion 20 and snaps into the slot 322, the protuberance 50 also moves into the slot 32 and between the shoulders 36, 38 as illustrated in FIG. 4. Since the shoulder 38 extends somewhat beyond the shoulder 36, it is engaged by the protuberance 50 and defines a stop that prevents the lock member from moving beyond the closed position. The shoulder 36 also acts to frictionally engage the peripheral edge of the lock member 18 adjacent to the protuberance 50 and thereby cooperates with the shoulder 38 to positively position the lock member in the closed position thereof. It is understood, that when the chain is to be disengaged from the clasp 10, the lock member 18 moved to the open position thereof as illustrated in FIG. 6 by grasping the tab 48 and urging the lock member in a pivotal movement to expose the opening 26, space 28 and slot 32. The ring 14 may then be slid outwardly over the hook 30 to release the free end of the chain from the clasp 10.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A clasp for an ornamental chain, comprising a base member having a central portion to which end portions are joined, one end of said chain being permanently connected to an end portion, said central portion having an opening formed therein that defines a marginal edge, a portion of which is cut out to form a space, the portion of said marginal edge adjacent to said space defining a hook on which the other end of said chain is releasably received for interconnecting the other end of the chain to said base member, and a lock member including a main body to which an extension is joined, said extension being pivotally connected to said base member at an end portion thereof so that the pivot connection is offset with respect to the axis of said central portion, said lock member being pivotally movable from an open position, wherein the main body of the lock member is offset with respect to the central portion of the base member and the opening in said central portion and the space in the marginal portion thereof are exposed, to a closed position, wherein the main body of the lock member is locatable in overlying relation with respect to said opening in the base member and space formed in the marginal edge thereof for preventing exterior access to the space, and thereby locking the other end of said chain to said base member.

2. A clasp as claimed in claim 1, the other end portion joined to said central portion having a slot formed therein that communicates with the opening in said central portion, the slot in the other end portion being exposed when said lock member is in the closed position to provide a space for interconnection of the other end of said chain therein.

3. A clasp as claimed in claim 2, said base member and lock member being formed of relatively flat stock.

4. A clasp as claimed in claim 2, means formed on said lock member for positively locating said lock member in the closed position thereof.

5. A clasp as claimed in claim 4, said locating means including a detent formed on said lock member that is receivable in the slot in the other end portion when said locking member is moved to the closed position thereof.

6. A clasp in claimed in claim 4, spaced shoulders formed on said other end portion adjacent to the slot formed therein, said lock member having a cam edge that is receivable between said shoulders when the lock member is moved to the closed position thereof.

7. A clasp as claimed in claim 4, a tab joined to said lock member and projecting outwardly therefrom and defining a finger grip for pivotally moving said lock member to and from the open and closed positions thereof.

8. A clasp as claimed in claim 1, the central portion of said lock member having a generally circular configuration and the opening therein being formed centrally thereof, the main body of said lock member having a generally circular configuration that conforms substantially to that of the base member when the lock member is in the closed position thereof.

9. A clasp as claimed in claim 8, the extension as joined to the main body of said lock member corresponding generally with respect to the configuration of the end portion of said base member to which it is joined.

10. A clasp for an ornamental chain, comprising a base member having a central portion to which end portions are joined, one end of said chain being permanently connected to an end portion, said central portion having an opening formed therein that defines a marginal edge, a portion of which is cut out to form a space, the portion of said marginal edge adjacent to said space defining a hook on which the other end of said chain is releasably received for interconnecting the other end of the chain to said base member, and a lock member pivotally connected to said base member at an end portion thereof, said lock member being pivotally movable from an open position, wherein the opening in said central portion and the space in the marginal portion thereof are exposed, to a closed position, wherein the lock member is locatable in overlying relation with respect to said opening in the base member and space formed in the marginal edge thereof for preventing exterior access to the space, and thereby locking the other end of said chain to said base member, the other end portion joined to said central portion having a slot formed therein that communicates with the opening in said central portion, the slot in the other end portion being exposed when said lock member is in the closed position to provide a space for interconnection of the other end of said chain therein, means formed on said lock member for positively locating said lock member in the closed position thereof, spaced shoulders formed on said other end portion adjacent to the slot formed therein, said lock member having a cam edge that is receivable between said shoulders when the lock member is moved to the closed position thereof, one of said shoulders projecting more inwardly toward the central portion of the base member than the other and forming a stop against which the cam edge is engaged in the closed position of the lock member and which prevents further pivotal movement of the lock member therebeyond.

* * * * *